United States Patent [19]

Hickey

[11] 4,136,296

[45] Jan. 23, 1979

[54] HIGH-SPEED, LAMINATED ROTOR FOR HOMOPOLAR INDUCTOR ALTERNATOR

[75] Inventor: John S. Hickey, Schenectady, N.Y.

[73] Assignee: General Electric Company, Schenectady, N.Y.

[21] Appl. No.: 806,599

[22] Filed: Jun. 15, 1977

[51] Int. Cl.² ............................................. H02K 1/24
[52] U.S. Cl. .................................... 310/269; 310/155
[58] Field of Search ............... 310/262, 269, 178, 216, 310/218, 155, 168, 112, 114, 126

[56] References Cited

U.S. PATENT DOCUMENTS

| 1,682,086 | 8/1928 | Modigliani | 310/155 |
| 1,684,343 | 9/1928 | Cardellino | 310/155 |
| 1,915,655 | 6/1933 | Eisemann | 310/155 |
| 1,990,678 | 2/1935 | Vaucher | 310/269 |
| 1,996,947 | 4/1935 | Beeh | 310/155 |
| 2,243,318 | 5/1941 | Rawlings | 310/263 |

Primary Examiner—Mark O. Budd
Attorney, Agent, or Firm—Nathan D. Herkamp; Joseph T. Cohen; Leo I. MaLossi

[57] ABSTRACT

In a high-speed homopolar inductor alternator rotor, formed laminations are employed to reduce eddy current losses in the pole faces. The lamination configuration keeps magnetic path reluctance to a minimum, while also reducing leakage flux, since each lamination, in extending from a pole face where flux enters the rotor to a pole face where it exits, passes through a region radially-inward of the salient poles, while presenting a minimum of magnetic material in a position to contribute to unwanted leakage flux.

4 Claims, 9 Drawing Figures

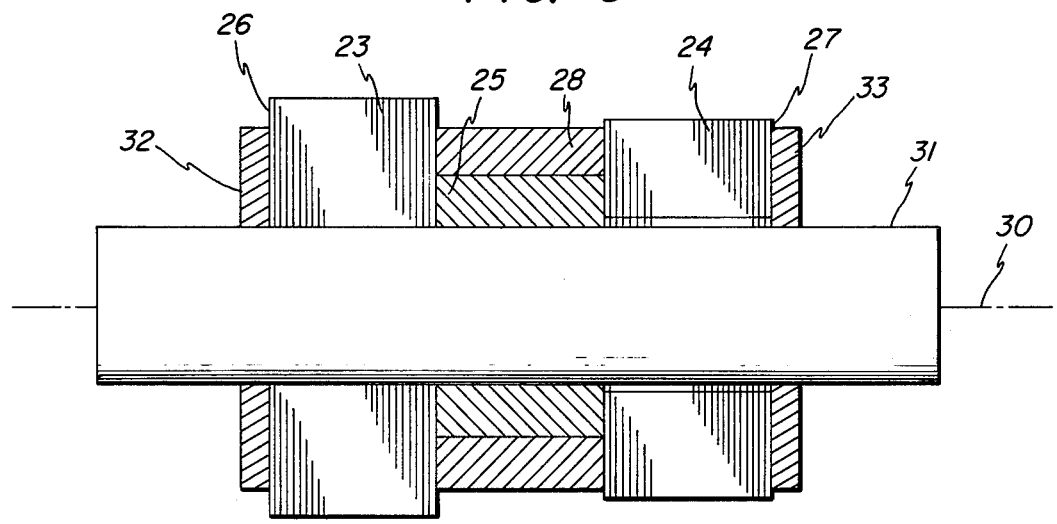
FIG. 3
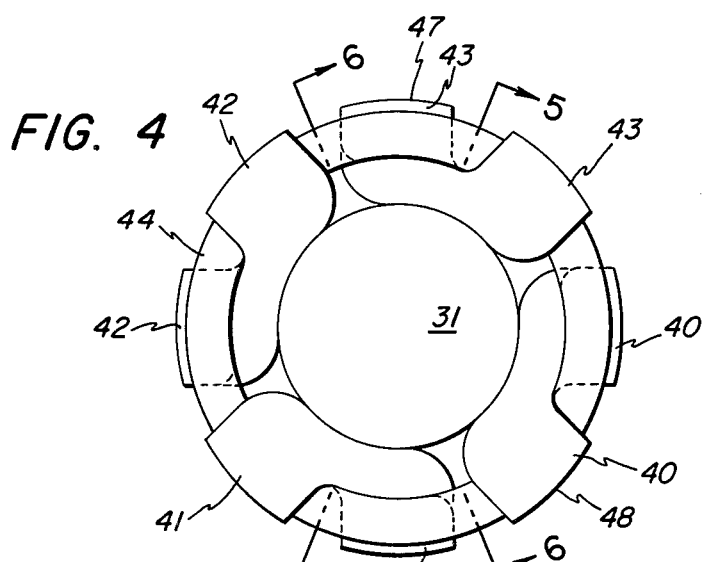
FIG. 4
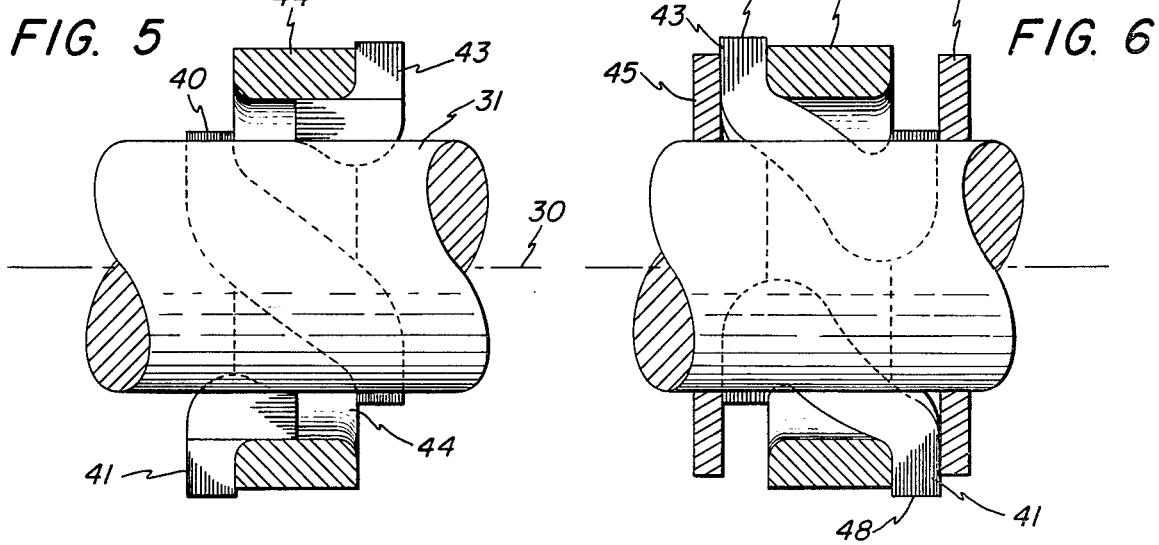
FIG. 5
FIG. 6

HIGH-SPEED, LAMINATED ROTOR FOR HOMOPOLAR INDUCTOR ALTERNATOR

INTRODUCTION

This invention relates to inductor alternator rotors, and more particularly to a high-speed homopolar inductor alternator rotor having poles comprised of shaped laminations.

In high-speed flywheel energy storage systems, such as are useful in generating mobile electrical power for vehicular transportation, limitations on volume and weight of the drive system necessitate use of small, lightweight alternators with high power output capabilities. This, in turn, requires that the alternator operate at high speed. Conventional wound rotor alternators, however, are limited in operating speed since, at high angular velocities, typically above about 26,000 rpm, mechanical stresses in the rotor windings become excessive. Solid rotor machines, therefore, are virtual necessities at high angular velocities since only a solid rotor can withstand the mechanical stresses incurred at the higher operating speeds. Typical of such solid rotor machine is the homopolar inductor alternator. In such machines, the rotor carries no windings and is basically comprised only of magnetic material, thus facilitating rotor operating speeds in excess of 90,000 rpm. The excitation field for establishing the rotor magnetic poles is situated on the stator between two longitudinally-separated stacks of stator laminations. A multi-phase AC stator winding is wound through corresponding slots in the two stator stacks.

In homopolar alternators of this type, voltage is induced in the stator AC windings due to variation of the air-gap length (i.e., variation in air-gap permeance) as the rotor poles rotate relative to the stator windings. The permeance variations cause flux to vary from a very high value when permeance is large, to a very low value when permeance is small. Since the DC excitation from the field coil winding induces north and south poles along the axis of the rotor such that opposite complementary poles are at longitudinally-separated regions of the rotor, respectively, it is customary to offset the opposite complementary rotor poles by 180 electrical degrees from each other in order to induce voltage of the proper polarity in both individual portions of the stator windings. Otherwise, the north and south rotor poles would move past a stator coil side having one half in one portion of the stator windings and the other half in the other portion of the stator windings at the same time, so that the voltages induced in the coil side halves, being of opposite polarities, would cancel each other. Hence it is necessary to offset mechanically the two rotor halves by an appropriate amount in order to achieve the desired 180° electrical offset. For an eight pole stator design, for example, the 180° electrical offset requires a 360°/8 or 45° mechanical offset of the two rotor halves.

With the rotor poles mechanically offset by 45° in an eight pole machine, the center portion of the rotor located between the two offset rotor pole sections must carry the entire flux from one rotor half to the other. Being that the center portion of the rotor is necessarily of smaller outer diameter than the salient rotor poles themselves, it experiences a high flux density.

The typical high-speed inductor alternator rotor is fabricated of a single piece of magnetic steel. Consequently, eddy currents are induced in the pole faces due to the nature of the flux entering the faces. The eddy currents flowing in each pole face cause electrical loss and attendant heating of the pole face. Both of these conditions are detrimental to normal alternator operation. Moreover, because the entire rotor is magnetic, very large amounts of flux lines do not thread the air gaps, and thereby fail to contribute to alternator output power, while saturating the rotor iron.

A common technique for reducing losses due to eddy current flow is to employ a laminated structure so as to interrupt continuity of the eddy current paths. In an inductor alternator rotor, this approach heretofore has not been very beneficial due to the three-dimensional nature of the flux paths therein which makes it impossible to use planar laminations that are everywhere parallel to the flux paths. The present invention overcomes this problem.

Accordingly, one object of the invention is to provide an inductor alternator rotor employing laminations which are everywhere generally parallel to flux paths induced in the rotor.

Another object is to provide a high-speed inductor alternator rotor exhibiting relatively low electrical losses.

Another object is to provide a high-speed, laminated pole, inductor alternator rotor which exerts essentially no relative torque and longitudinally-outward forces on nonmagnetic end clamps holding the magnetic material of the rotor in place.

Briefly, in accordance with a preferred embodiment of the invention, a rotor for a high-speed inductor alternator having two sets of salient poles, respectively, at longitudinally-separated regions of the rotor, respectively, the poles of one set being offset circumferentially by a predetermined angle from the poles of the other set, comprises a plurality of nested laminations. Each of the laminations extends continuously from the face of one pole in one of the regions to the face of an opposite pole in the other of the regions. Nonmagnetic restraining means constrain the nested laminations within a fixed radial distance from the rotor longitudinal axis. An end clamp is situated at each longitudinal end, respectively, of the nested laminations, each of the end clamps being configured to abut substantially the entire longitudinally-outer surface at each end, respectively, of the radially-innermost one of the laminations.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 3 is a side view of a laminated rotor of overall configuration such as shown in FIG. 1, but wherein planar laminations are employed in making up the poles;

FIG. 4 is an end view of a laminated rotor of overall configuration such as shown in FIG. 1, but having curved laminations extending between a pole face in one region of the rotor and a pole face in the other region of the rotor as evident in FIGS. 5 and 6;

FIG. 5 is a partial sectional view of the laminated rotor of FIG. 4, taken along line 5—5 thereof;

FIG. 6 is a partial sectional view of the laminated rotor of FIG. 4, taken along line 6—6 thereof, showing nonmagnetic end clamps holding the laminations in place;

DESCRIPTION OF TYPICAL EMBODIMENTS

Figure 1:
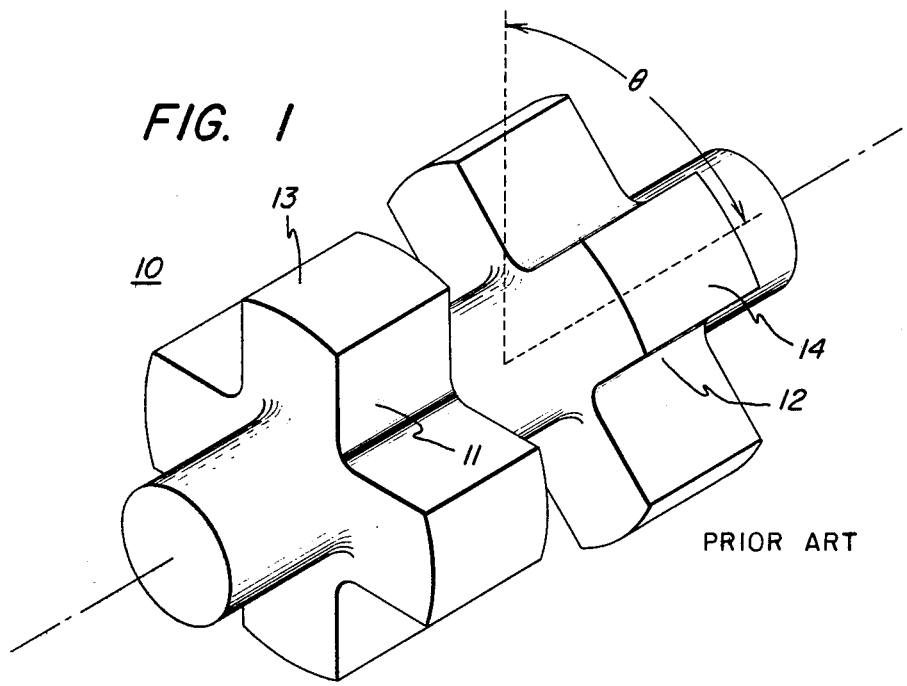
FIG. 1 illustrates a homopolar inductor alternator rotor fabricated of solid magnetic material as known in the prior art.

In FIG. 1, a conventional rotor 10 for an eight-pole homopolar inductor alternator is illustrated. This rotor, comprised of solid magnetic steel, is employable with a conventional wound stator (not shown) of the type described by E. Richter in the Conference Proceedings of the 1971 *Intersociety Energy Conversion Engineering Conference,* Boston, Mass., pages 132-139, Aug. 3-5, 1971. The rotor is formed with two general regions 11 and 12, each region including half the total number of rotor poles. The salient poles in region 11 are circumferentially offset from the salient poles in region 12 by an angle $\theta$ which is defined as $360°/n$, n being the total number of poles on the rotor. For an eight-pole rotor, as shown in FIG. 1, angle $\theta$ equals 45°.

Figure 2A:
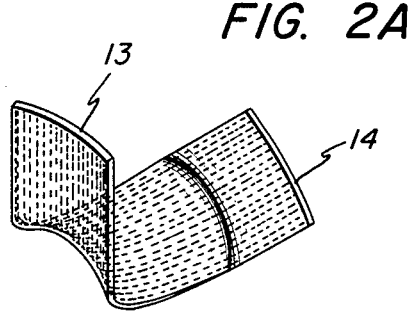
FIGS. 2A and 2B are a fragmentary end view and side view, respectively, of the rotor configuration shown in FIG. 1, illustrating magnetic flux paths extending, through a thin segment of magnetic material, from a pole face in one region of the rotor to a pole face in the other region of the rotor.
Figure 2B:
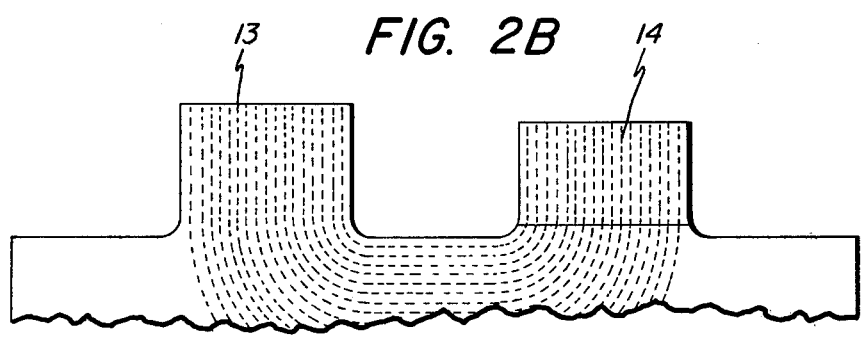

The only magnetic material required for proper rotor operation is that which provides flux paths between corresponding pole faces, such as faces 13 and 14 of the rotor shown in FIG. 1. One thin segment of this material is illustrated in FIG. 2A as it would appear if the rotor, shown in FIG. 1, is viewed longitudinally from the left end. Any more magnetic material other than similar segments typified by that shown in FIG. 2A is extraneous to the magnetic circuit for the flux path furnished by the material of FIG. 2A, and can only increase the leakage flux. FIG. 2B illustrates rotor magnetic flux paths when the rotor is viewed from the side.

During operation of the homopolar alternator containing rotor 10, magnetic flux which enters a pole face in one region exits the opposite complementary pole face in the other region. Specifically, magnetic flux entering pole face 13 may exit at pole face 14. Minor variations in the flux passing through pole faces 13 and 14 due to relative motion of the stator, produce eddy current flow in the faces, causing electrical loss and attendant heating of the pole faces. Moreover, since the entire rotor is magnetic, there exist large amounts of magnetic flux that do not pass through the air gaps located between the stator and the pole faces on the rotor. This flux tends to saturate the rotor iron without contributing to the alternator output. Efficiency of the machine is thereby reduced.

Prior attempts to alleviate the aforementioned problems due to eddy currents arising when the rotor shown in FIG. 1 is employed, involved use of planar laminations in the manner illustrated in FIG. 3. This structure allows much of the rotor intermediate the regions containing the poles to be fabricated of nonmagnetic material, so that leakage flux can be reduced. Specifically, a solid ring 25 of magnetic material abuts, and is situated between, first and second stacks 26 and 27, respectively, of planar laminations of magnetic steel in order to form a low reluctance path between radially-consecutive poles formed by the laminations and separated axially. A nonmagnetic spacer 28 encircles ring 25 and helps maintain lamination stacks 26 and 27 packed tightly together and oriented normal to longitudinal axis 30 of rotor shaft 31. The stacks of laminations are urged toward each other axially by nonmagnetic end clamps 32 and 33 in a manner well known in the art. This configuration, by employing nonmagnetic spacer 28 to help keep the radially-outer portions of lamination stacks 26 and 27 uniformly spaced apart from each other, avoids the necessity of having to add iron around magnetic ring 25, thereby holding the amount of leakage flux to a low value. However, the main flux, in its path from rotor pole face 23 to rotor pole face 24, must move longitudinally, as well as circumferentially, as it passes from laminations to solid magnetic material 25 and back to laminations again. In so doing, much of the flux in each of the rotor poles must cross from lamination to lamination. Consequently, reluctance is thus added to the air gap for each of the poles, so that this form of rotor construction is not very practicable. Hence, while making much of the rotor non-magnetic can result in greatly reducing the total amount of leakage flux, along with the problems introduced thereby, the reluctance thereby added to the air gaps makes the structure not very practicable.

If four stacks are made up of laminations configured according to the shape of the magnetic material providing the flux path shown in FIG. 2A, and are encircled by a nonmagnetic ring, the structure illustrated in FIGS. 4, 5 and 6 results, FIGS. 5 and 6 being based on section views taken along lines 5—5 and 6—6, respectively, in FIG. 4. The four stacks 40, 41, 42 and 43 of laminations are assembled about a shaft 31 and encircled by a nonmagnetic ring 44 which holds them circumferentially in place about the shaft. The subassembly thus formed is assembled into a complete rotor, as shown in FIG. 6.

In FIG. 6, laminated pole faces 47 and 48 are illustrated as being fabricated of laminations of the type shown in FIG. 2A assembled in the manner indicated in FIG. 4. The laminations are disposed about shaft 31 and are encircled by nonmagnetic ring 44, which retains them tightly about shaft 31. The laminations are held in place, axially, by nonmagnetic end clamps 45 and 46 in a manner well known in the art. The rotor of FIG. 6 thus employs a minimum amount of magnetic material. However, the shape of the individual rotor laminations makes the rotor difficult to fabricate, and the centrifugal force exerted upon them when rotating must be withstood almost entirely by retaining ring 44. Moreover, the rotor segments are skewed with respect to longitudinal axis 30 of shaft 31, so that a relative torque is exerted between end clamps 45 and 46 as the laminations of the rotor tend to reach a minimum energy position during rotation. This minimum energy position tends to cause the lamination portions at either section of the rotor to align themselves radially, and also tends to cause end clamps 45 and 46 to move apart axially. The forces thus exerted during high-speed operation may be sufficiently great to cause a mechanical failure somewhere on the rotor, and hence this configuration is not altogether satisfactory for a high-speed machine.

Figure 7:
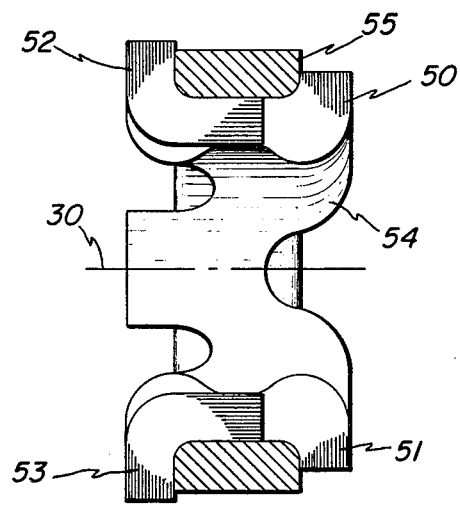
FIG. 7 is a partial sectional view of a laminated rotor of overall configuration such as shown in FIG. 1, but wherein shaped laminations extend between each of the pole faces in one region of the rotor and each of the pole faces in the other region of the rotor, with a nonmagnetic restraining ring encircling the laminations between the two rotor regions.

FIG. 7 illustrates an assemblage of nested rotor laminations about rotor axis 30, which is superior to the configuration illustrated in FIGS. 4, 5 and 6. This construction permits the four pole quadrants at either end of the rotor to be joined to those at the opposite end of the rotor through their mid regions, and yet each lamination provides a continuous, low reluctance path between each pole face, respectively, at one end of the rotor and each pole face of the opposite, complementary pole, respectively, at the other end of the rotor. Since each lamination is continuous circumferentially between the set of poles situated at each end of the rotor (while the configuration shown in FIGS. 4, 5 and 6 employs non-magnetic material between circumferentially-consecutive poles), there is more magnetic material employed in the configuration shown in FIG. 7 than in that shown in FIGS. 4, 5 and 6. The extra magnetic material employed in the configuration of FIG. 7 is situated radially inward from the pole faces so that its contribution to leakage flux is essentially negligible. The partially cutaway illustration in FIG. 7 shows merlon regions 50 and 51 forming circumferentially-successive salient poles in one section of the rotor, and merlon regions 52 and 53 comprising separate salient poles in the opposite region of the rotor. A portion of radially-innermost lamination 54 is visible in FIG. 7 and comprises a unitary piece of magnetic material, such as magnetic steel. A nonmagnetic band 55 encircles and constricts the laminations of the rotor in order to hold them circumferentially in place against the rotor even when experiencing high centrifugal force due to high-speed operation of the alternator. Band 55 may comprise fiber-reinforced glass. In the alternative, band 55 may be comprised of nonmagnetic stainless steel of the 300 series, titanium wire, or other suitable nonmagnetic material. The magnetic material radially-beneath restraining ring 55 aids in resisting centrifugal forces and, additionally, provides support for each magnetic pole on the rotor. This support is symmetric about longitudinal axis 30 of the rotor.

Figure 8:
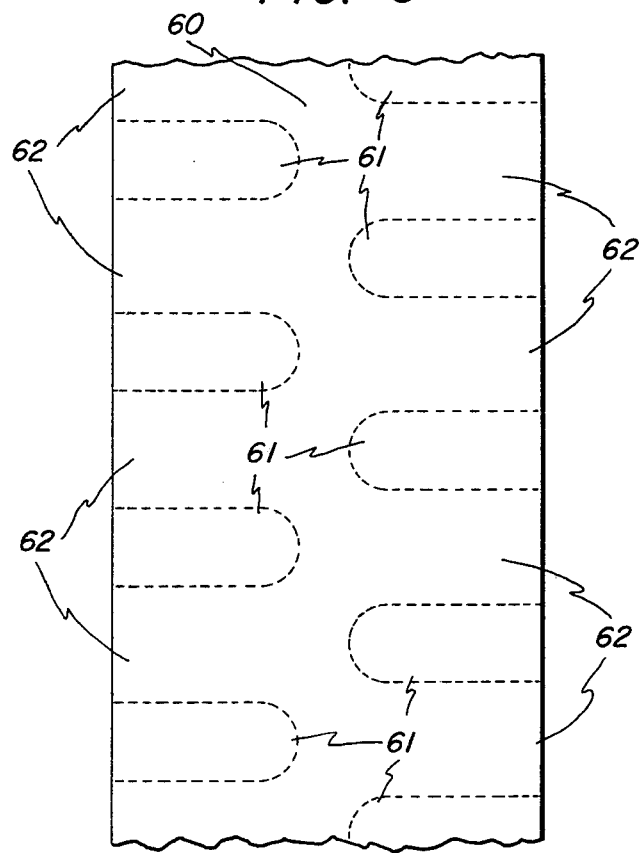
FIG. 8 is a plan view of a typical unmachined lamination, opened flat, of the type employed in the structure shown in FIG. 7.

FIG. 8 is a plan view of a single, planar lamination 60, conveniently of rectangular shape, as it appears prior to being rolled into a cylinder for use on the rotor of the instant invention. Lamination 60 may be assembled into a stack along with other laminations of similar configuration, and the stack rolled into a cylinder of coaxial laminations having its inner diameter corresponding to the outer diameter of the rotor shaft about which it is to be situated, and its outer diameter conforming to the inner diameter of the retaining ring which is to encircle the laminations. It is feasible to use only one lamination of sufficient length. The cylinder thus formed is crenellated by removing segments 61, thereby forming merlons 62 of the width of each pole piece. Crenels 61 and merlons 62 at either end of the cylinder are circumferentially offset from the respective crenels and merlons at the opposite end of the cylinder by an angle of 360°/n, n being the total number of rotor poles. After the rotor shaft is inserted into the cylinder, the entire cylinder is clamped into a restraining ring and the rotor poles are formed by bending the merlons radially outward into protuberances of axial thickness determined by the total thickness of the laminations. This may be accomplished, for example, by use of a shaping punch. The overall length of the cylinder is thus determined by the radially-innermost lamination, which is the longest lamination. After the rotor is assembled as illustrated in FIG. 7, each of the radially-outer surfaces of the rotor poles is machined to provide a cylindrical pole face normal to a respective radius of the rotor. This manufacturing sequence is simpler than that for the rotor illustrated in FIG. 3 and the rotor illustrated in FIGS. 4, 5 and 6.

As an additional advantage of the structure illustrated in FIG. 7, a surrogate clamp may readily be employed in place of ring 55 during manufacture of the rotor. After the rotor is assembled, the surrogate clamp is replaced with a composite band wound under tension directly on the pole laminations in order to gain the added strength of a composite material in resisting the large centrifugal forces experienced by the rotor when operating at high speeds.

The foregoing describes an inductor alternator rotor employing laminations which are everywhere generally parallel to the rotor flux paths. The high-speed inductor alternator rotor thus formed exhibits relatively low electrical losses and essentially no relative torque nor longitudinally-outward forces on nonmagnetic end clamps holding the magnetic material of the rotor in place.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A rotor for a high-speed inductor alternator having two sets of salient poles, respectively, at longitudinally-separated regions of the rotor, respectively, the poles of one set being offset circumferentially by a predetermined angle from the poles of the other set comprising:
   a plurality of nested laminations, each of said laminations extending continuously from the face of one pole through a mid-region extending generally parallel to an axis of rotation of the rotor and which rotates with said poles around said axis during operation of said alternator in one of said regions to the face of an opposite pole in the other of said regions;
   said plurality of laminations constituting a low reluctance path interconnecting each of said poles in one of said regions to each of said poles in the other of said regions;
   nonmagnetic restraining means constraining said nested laminations within a fixed radial distance from the rotor longitudinal axis; and
   an end clamp situated at each longitudinal end, respectively, of said nested laminations, each of said end clamps being configured to abut substantially the entire longitudinally-outer surface at each end, respectively, of the radially-innermost one of said laminations.

2. The rotor of claim 1 wherein the radially-outer surface of each of said poles is substantially cylindrical and normal to a respective radius of said rotor.

3. A rotor for a high-speed inductor alternator having n salient poles, comprising:
   a plurality of coaxial laminations, each of said laminations being crenellated at both ends to form a plurality of alternate merlons and crenels, the merlons at either end being offset radially from the merlons at the opposite end by an angle of 360°/n, each of said merlons being bent radially outward so as to form a cylindrical portion of axial thickness determined by the total thickness of said laminations, connected to each cylindrical portion on the opposite end of the laminations by a mid-region extending generally parallel to an axis of rotation of said rotor, and which mid-region rotates with said cylindrical portion around said axis during operation of said alternator;

nonmagnetic restraining means encircling and constricting the cylinder defined by said coaxial laminations; and an end clamp situated at each end, respectively, of said cylinder, each said end clamp being configured to abut substantially the entire longitudinally-outer surface portion of the innermost one of said laminations.

4. The rotor of claim 3 wherein the radially-outer surface of each of said poles is substantially cylindrical and normal to a respective radius of said cylinder.

* * * * *